(12) United States Patent
Rupp et al.

(10) Patent No.: US 8,919,490 B2
(45) Date of Patent: Dec. 30, 2014

(54) POWER STEERING SYSTEM

(75) Inventors: Arthur Rupp, Huettlingen (DE); Steffen Truthmann, Schwaebisch Gmuend (DE)

(73) Assignee: ZF Lenksysteme GmbH, Schwaebisch Gmuend (DE)

( * ) Notice: Subject to any disclaimer, the term of this patent is extended or adjusted under 35 U.S.C. 154(b) by 35 days.

(21) Appl. No.: 13/602,501

(22) Filed: Sep. 4, 2012

(65) Prior Publication Data

US 2013/0233637 A1 Sep. 12, 2013

Related U.S. Application Data

(63) Continuation of application No. PCT/EP2011/054188, filed on Mar. 21, 2011.

(30) Foreign Application Priority Data

Mar. 25, 2010 (DE) .......................... 10 2010 003 233

(51) Int. Cl.
*B62D 5/02* (2006.01)
*B62D 5/04* (2006.01)
*F16H 25/24* (2006.01)
*F16C 27/06* (2006.01)

(52) U.S. Cl.
CPC .............. *B62D 5/0448* (2013.01); *F16H 25/24* (2013.01); *F16C 27/066* (2013.01)
USPC .......................................... 180/444; 180/443

(58) Field of Classification Search
CPC ... B62D 5/0409; B62D 5/0448; B62D 5/0445

USPC .................................................. 180/443, 444
See application file for complete search history.

(56) References Cited

U.S. PATENT DOCUMENTS

| 7,682,086 B2 * | 3/2010 | Budaker et al. | 384/536 |
| 8,307,940 B2 * | 11/2012 | Bugosh et al. | 180/444 |
| 2004/0182639 A1 * | 9/2004 | Tatewaki et al. | 180/446 |
| 2007/0217725 A1 * | 9/2007 | Budaker et al. | 384/536 |
| 2011/0167940 A1 * | 7/2011 | Shavrnoch et al. | 74/89.36 |
| 2011/0220432 A1 * | 9/2011 | Bugosh et al. | 180/444 |
| 2012/0024618 A1 * | 2/2012 | Houdayer et al. | 180/447 |

FOREIGN PATENT DOCUMENTS

| DE | 103 10 492 | 9/2004 |
| DE | 10 2006 037 479 | 2/2008 |
| DE | 10 2008 041 872 | 3/2010 |

* cited by examiner

*Primary Examiner* — Joseph M Rocca
*Assistant Examiner* — Michael Stabley
(74) *Attorney, Agent, or Firm* — Jordan and Hamburg LLP

(57) ABSTRACT

A power steering system for a vehicle comprises a lead screw which is driven by a servo motor and which is composed of a nut that is mounted axially non-displaceably in a frame, and an axially displaceable component, the thread of which is engaged with a thread of the nut, wherein the nut is mounted in the frame by a rolling bearing. At least one side of the rolling bearing is provided on an outer ring with at least one respective bearing disk, the side of which facing away from the outer ring is provided in the radial region of the outer ring with a ring or an annular component made of elastomeric material, wherein the ring protrudes in the axial direction over the outer surface of the respective bearing disk when the rolling bearing is not installed.

4 Claims, 2 Drawing Sheets

POWER STEERING SYSTEM

This is a Continuation of PCT/EP2011/054188 Filed Mar. 21, 2011.

BACKGROUND OF THE INVENTION

The invention relates to a power steering system, and more particularly to a power-assisted steering system for a vehicle, comprising a lead screw which is driven by a servo motor and which is composed of a nut that is mounted axially non-displaceably in a frame, and an axially displaceable component.

Power steering systems, and more particularly electrical power-assisted steering systems in passenger cars, in which the servo motor transmits the rotational speed and torque via a traction mechanism gear to a nut, and more particularly a recirculating ball nut, are known from the prior art. To this end, a servo motor and the toothed rack, or the spindle section of the rack, driven by the nut are frequently disposed axially parallel to each other.

For example, DE 103 10 492 A1 describes an electrical power steering system, wherein an electric motor drives a component which is mounted in a steering gear housing so as to be axially displaceable. The component is designed as a toothed rack, and a ball screw of the component is mounted in engagement with a nut thread of a frame designed as the steering gear housing in an axially non-displaceable manner. The nut is non-rotatably connected to a belt pulley of a traction mechanism gear between the servo motor and the lead screw thus formed. The nut is supported and mounted on the steering gear housing by way of a radial fixed bearing, which is a rolling bearing. The radial bearing is frequently designed as a four-point bearing, especially since axial forces must also be absorbed. An inner ring of the rolling bearing is axially supported on the components mounted on the nut, such as the belt pulley and a stop in form of a ring or snap ring. The radial bearing is frequently axially delimited in relation to the components of the power steering system by bearing disks, wherein some of the functions of the bearing disks can also be assumed by other components of the power steering system. This often requires applying a tilting moment to the outer ring of the radial bearing. In addition, the bearing disks are made of material which conducts sound well and they are frequently seated directly against a housing of the power steering system, so that sound can be directly radiated to the surroundings of the power steering system.

DE 103 10 492 A1 describes an electrical power-assisted steering system, comprising a lead screw which is driven by a servo motor and composed of a nut that is mounted axially non-displaceably in a frame, and an axially displaceable component, the thread of which is engaged with a thread of the nut, wherein the nut is mounted in the frame designed as a steering gear housing by means of a rolling bearing. An outer ring of the rolling bearing is directly supported on a gearbox cover of the power steering system.

SUMMARY OF THE INVENTION

Proceeding from this prior art, it is the object of the invention to provide a power steering system which exhibits optimized force introduction in the ball screw thereof and minimal operating noise.

By providing both sides of the rolling bearing on an outer ring with at least one respective bearing disk, the side of which facing away from the outer ring is provided in the radial region of the outer ring with a ring made of elastomeric material, wherein the ring, when the rolling bearing is not installed, protrudes in the axial direction over the outer surface of the respective bearing disk and projects away from the bearing disk and the outer ring, a design measure is implemented which creates a linear flow of force through the rolling bearing, and more particularly through the outer ring, and prevents tilting moments, because the ring made of elastomeric material is located in the respective radial region of the outer ring and is used to introduce force from the steering gear housing or frame into the outer ring and back into the frame. When the rolling bearing is installed, this bearing is thus additionally supported on a preloaded elastomer, and not on a bearing disk made of metal, for example, whereby sound conduction from the interior of the steering gear via the outer ring of the rolling bearing is notably prevented. Instead of the ring made of elastomeric material, it is also possible to provide individual segments made of elastomeric material, which are disposed in an annular form.

In a particularly preferred embodiment of the power steering system, the ring made of elastomeric material projects from the outer surface of the respective bearing disk in a U shape and can be compressed along the longitudinal axis.

The ring can be produced from a rubber material or another synthetic elastomer which is resistant to the operating substances in the environment. When the power steering system is assembled, each ring is axially compressed, whereby the rolling bearing is disposed in a "hydraulically" suspended manner in the frame or steering gear housing.

The ring made of an elastomeric material can preferably be vulcanized on each bearing disk. The bearing disks, or at least one bearing disk, on the rolling bearing can be produced from a metal material, for example steel, or it can be produced from an engineering plastic material or high-performance plastic material. It is recommended to use engineering plastics such as polyamide, polyoxymethylene or polyethylene terephthalate for producing the bearing disks. Polyamides (PA) are the most important engineering plastics in which the basic building blocks are joined to each other by carboxylic acid amide groups. There are two different groups of polyamides: polyamide 6-type, the basic material of which is produced by the polycondensation of $\omega$-aminocarboxylic acids or polymers of the lactams thereof, or the polyamide 66-type, the basic material of which is produced by the polycondensation of diamines and dicarboxylic acids. Differences between the various polyamides are caused by varying crystallinity, the ratio of $CH_2$—/$CONH$ groups in the polymers, an even- or odd-numbered carbon atomic number and the distance between adjacent macromolecules, and thus the crystallinity degree thereof. The properties of polyamides, such as flexural strength, surface hardness and the like, can be considerably influenced by additives such as glass fibers, glass spheres, mineral powders, carbon fibers or graphite and molybdenum sulfide. Semi-crystalline polyamides have high to medium strength and medium stiffness, low hardness, good to excellent impact resistance and good sliding and wear properties. Polyoxymethylene (POM) has medium to high strength (endurance strength) and stiffness and is suitable for the production of components having tight tolerances, such as gear wheels and the like. Polyethylene terephthalate (PET) has high stiffness and hardness and high abrasion resistance. It also exhibits good thermal expansion and is well-suited for the production of bearing disks.

High-performance plastics such as polyaryletherketones, for example polyetheretherketone or polyetherketone, exhibit high mechanical endurance strength and good sliding and wear behavior. They retain the good strength properties thereof at temperatures of more than 250° C.

Plastic material is therefore also well-suited for implementing an offset cross-section of the bearing disks in the sense that the bearing disks, from the centers thereof toward the radial edges thereof, are each shaped toward the outer ring. This creates installation space in the axial direction, which can be utilized for arranging the ring made of elastomeric material. The total thickness of the bearing ring is decreased by the offset as compared to without offset.

The power steering system is preferably designed as an electrical power steering system having an axially parallel arrangement of the servo motor and toothed rack.

LIST OF REFERENCE NUMERALS 1 power steering system
2 lead screw
3 frame
4 nut
5 component, axially displaceable
6 thread
7 nut thread
8 rolling bearing
9 outer ring
10 bearing disk
11 side
12 radial region
13 ring
14 outer surface
15 power-assisted steering system, electrical
16 steering gear housing
17 toothed rack
18 spindle section
19 ball screw
20 belt pulley
21 inner ring
22 end face
23 axial stop
24 end face
25 plane
26 end face d thickness of 13
X installation direction
$d_1$ outside diameter
$d_2$ outside diameter
$d_3$ outside diameter The invention will now be described in more detail based on an exemplary embodiment and is illustrated based on the accompanying drawings.

DESCRIPTION OF THE PREFERRED EMBODIMENTS

Figure 1:
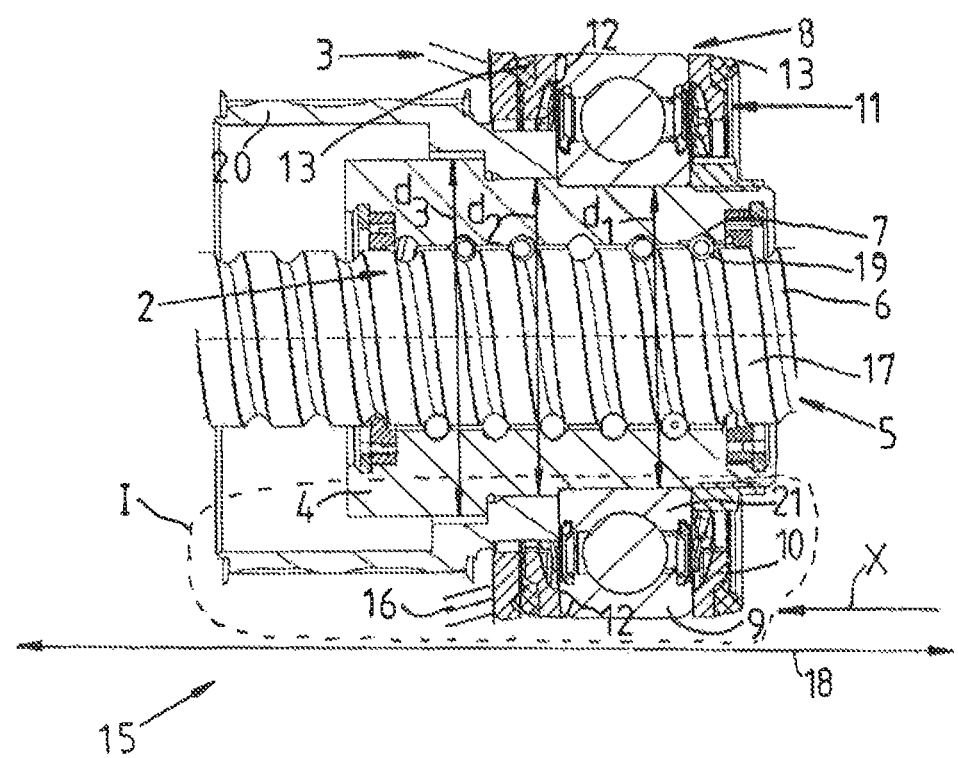
FIG. 1 is a partial schematic longitudinal section of a power steering system according to the invention.

FIG. 1 is a partial longitudinal section of a power steering system 1, designed as an electrical toothed track power-assisted steering system 15, for a passenger car or a commercial vehicle. An axially displaceable component 5, which is designed as a toothed rack 17, is mounted in a frame 3 designed as a cylindrical steering gear housing 16. Parallel to the toothed rack 17, an electrical servo motor, which is not shown, is fixed to a radial flange of the steering gear housing 16. On a toothing section (not shown), the toothed rack 17 meshes with a pinion (not shown) on a steering shaft and on a spindle section 18 comprises a thread 6 designed as a ball screw 19, which is engaged with a thread 7 of a nut 4 designed as a recirculating ball screw. The nut 4 and the spindle section 18 form a lead screw 2. The nut 4 is non-rotatably connected to a belt pulley 20 designed as a toothed disk (refer to FIG. 2) and held in a housing cover (not shown) of the steering gear housing 16 by way of a rolling bearing 8 designed as a radial bearing. The rolling bearing 8 is designed as a fixed bearing and is able to transmit axial and radial forces from the nut 4 to the frame 3.

Figure 2:
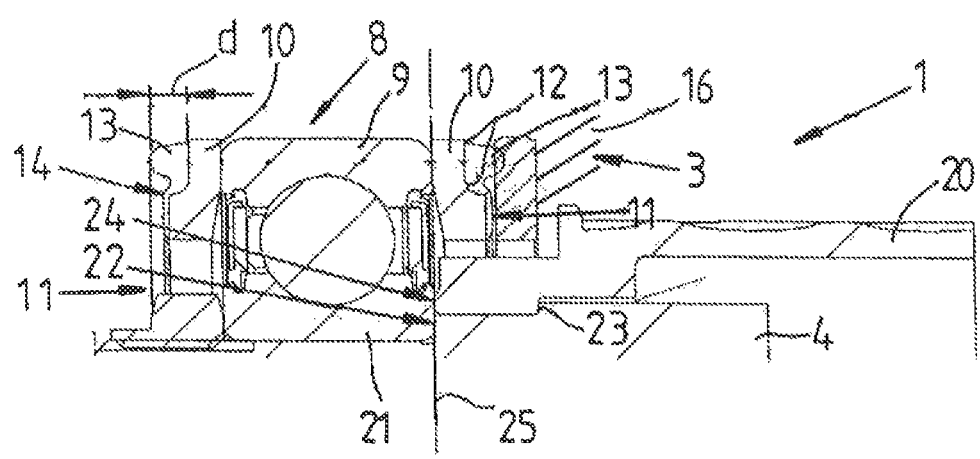
FIG. 2 is a detail I of FIG. 1.

As is shown in detail I in FIG. 2, on the outer circumference the nut 4 has two abrupt changes in diameter between which the contour of the nut 4 is cylindrical. As viewed from the outer circumferential side, the nut 4 forms a stepped cylinder. The outside diameter $d_1$ of the nut 4 is smallest in the radial region of the rolling bearing 8. This diameter corresponds to the inside diameter of an inner ring 21 of the rolling bearing 8. As seen looking from an installation direction X in the viewing direction of FIGS. 1 and 2 from right to left, the inner ring 21 is pushed onto the nut 4 and is seated against an end face 22 of the first diameter jump forming a stop. In the region of the stop, the nut 4 has an outside diameter $d_2$, which corresponds to the first outside diameter $d_1$ plus approximately half the thickness of the inner ring 21 (refer to FIG. 2). As seen looking in the viewing direction further to the left, a further diameter jump to a larger diameter $d_3$ is apparent on the outer circumferential surface of the nut 4, wherein the increase in diameter from $d_2$ to $d_3$ is approximately half as large as the increase in diameter from $d_1$ to $d_2$. The second jump in diameter from an outside diameter $d_2$ to $d_3$ serves as an axial stop 23 for the belt pulley 20, which thereby rests on the nut 4 so that the end face 24 of the pulley is located in a plane 25 with the end face 26 of the nut 4 at the first diameter jump.

During installation, the belt pulley 20 can thus be first pushed onto the nut 4 in the installation direction X and then the rolling bearing 8 can be pushed on in the same installation direction X, until reaching the stop of the inner ring 21 on the end face 22 or the stop of the nut 4, and also on the end face 24 or stop at the belt pulley 20.

Bearing disks 10 axially disposed on both sides of the rolling bearing 9 fix the rolling bearing 8 on the nut 4. As is shown in FIG. 2 in a detail I of FIG. 1, the bearing disks 10 are provided with an offset cross-sectional progression such that, starting from the nut 4, they are radially inclined toward the outer ring 9. On the sides 11 facing axially away from the outer ring 9, the bearing disks 10 are provided in the radial region 12 of the outer ring 9 with a ring 13 made of a rubber material, which is vulcanized on the circumference of the disks. The ring 13 has a U-shaped cross-section which is directed in the axial direction, so that it projects away from the respective bearing disk 10 in the manner of a nose-projecting way in each case from the respective rolling bearing outer ring 9. The entire outer surface 14 of each bearing disk 10 is coated with the elastomeric material of the ring 13, wherein the material thickness of the elastomeric layer in the radially inner region, in front of the offset of the respective bearing disk 10, is very low compared to the thickness d of the ring 13. The bearing disks 10 are supported on the outer ring 9, while on the opposing sides thereof the respective ring 13 made of elastomeric material serves as a support for the rolling bearing on the steering gear housing 16 or the cover thereof. When installed, the ring 13 is compressed approximately by half of the thickness d thereof, so that a kind of "hydraulic" installation of the rolling bearing is created, with the option of a linear flow of force from the respective support at the steering gear housing 16 via the respective ring 13 through the outer ring 9 of the rolling bearing 8.

The rolling bearing 8 is thus free of tilting moments and moreover is suspended well insulated with regard to sound conduction of operating noise of the ball nut spindle drive to the steering gear housing.

The invention claimed is:

1. A power-assisted steering system for a vehicle, comprising:
   a lead screw having an axial direction, a rolling bearing, a bearing disk, and an elastomeric ring; and
   wherein the lead screw is driven by a servo motor and comprises:
      a nut, which is mounted axially non-displaceably in a frame, and
      an axially displaceable component, the thread of which is engaged with a thread of the nut;
   wherein the nut is mounted in the frame by the rolling bearing;
   wherein the rolling bearing includes an outer ring positioned in a radial direction relative to the lead screw, the outer ring having a radial thickness which defines a radial region;
   wherein the bearing disk is axially disposed to at least one side of the rolling bearing;
   wherein the elastomeric ring comprises an elastomeric material and is axially disposed at a side of the bearing disk that faces away from the outer ring;
   wherein the elastomeric ring has a first side surface in direct contact with the bearing disk over an entire span oldie radial region defined by the thickness of the outer ring, and having a second side surface having a nose-shaped configuration extending axially away from the bearing disk and first side surface; and
   wherein the elastomeric ring is a first elastomeric ring and the bearing disk is a first bearing disk, and further comprising a second elastomeric ring axially positioned on another side of the rolling bearing axial to a second bearing disk, the second bearing disk being axially disposed to a side opposite to said one side of the rolling bearing, the first elastomeric ring being vulcanized on the first bearing disk and the second elastomeric ring being vulcanized on the second bearing disk.

2. The power-assisted steering system according to claim 1, wherein each one of the first and second bearing disk is produced from a metal material or from a plastic material.

3. The power-assisted steering system according to claim 1, wherein the cross-section of each one of the first and second bearing disk has an offset progression toward the outer ring.

4. The power-assisted steering system according to claim 1, wherein the power steering system is an electrical power-assisted steering system having an axially parallel arrangement of an axially displaceable component and servo motor.

\* \* \* \* \*